United States Patent [19] [11] Patent Number: 4,554,555
Aruga et al. [45] Date of Patent: Nov. 19, 1985

[54] RECORDING METHOD BY USE OF INKS

[75] Inventors: Tamotsu Aruga, Kamakura; Tadashi Fujii, Yokohama; Kakuji Murakami, Kawasaki; Eiichi Akutsu, Ichikawa, all of Japan

[73] Assignee: Ricoh Company, Ltd., Tokyo, Japan

[21] Appl. No.: 560,089

[22] Filed: Dec. 9, 1983

[30] Foreign Application Priority Data

Dec. 10, 1982 [JP] Japan ................................ 57-215486

[51] Int. Cl.$^4$ ............................................. G01D 15/16
[52] U.S. Cl. ......................................... 346/1.1; 106/20; 346/75; 346/135.1; 346/140 R; 427/150
[58] Field of Search ..................... 346/75, 140 R, 1.1, 346/135.1; 106/20, 22; 427/150

[56] References Cited

U.S. PATENT DOCUMENTS 3,870,435  3/1975  Watanabe ..................... 427/150 X
3,906,141  9/1975  Anderson ...................... 346/75 X
3,932,695  1/1976  Davis ............................ 427/150 X
4,142,738  3/1979  Steinbach ..................... 427/150 X
4,382,262  5/1983  Savit .............................. 346/1.1

Primary Examiner—Joseph W. Hartary
Attorney, Agent, or Firm—Flynn, Thiel, Boutell & Tanis

[57] ABSTRACT

A recording method by use of an ink is disclosed, in which images are formed by an aqueous ink comprising at least one dye selected from the group consisting of a pyrazolone azo dye, a phthalocyanine sulfonate dye, a xanthene dye and an azo dye on a recording medium containing at least one component selected from the group consisting of a water-soluble metal salt whose metal has an ion valence of 2 or more, an alkyl amine and a quaternary ammonium salt.

14 Claims, 1 Drawing Figure

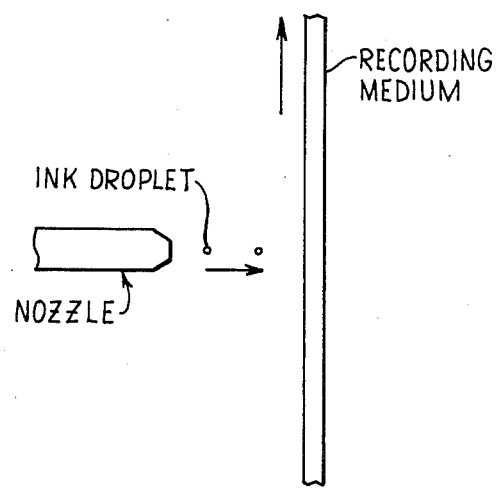

RECORDING METHOD BY USE OF INKS

BACKGROUND OF THE INVENTION

The present invention relates to a recording method by use of inks, and more particularly to a recording method by use of color ink, which method is particularly suitable for use in ink-jet printing.

Conventionally there are known color printing methods employing inks each containing at least one of primary color colorants, that is, cyan, yellow and magenta colorants. In these color printing methods, highly water-soluble dyes capable of yielding excellent color tone are employed. However, those dyes have the shortcoming that they are poor in water resistance and light resistance even if they are used alone or in combination.

In order to improve on the above conventional shortcoming, there has been proposed in Japanese Laid-open Patent Application Ser. No. 56-64992 a method of improving the water resistance of the recorded images by applying a polycationic agent to the surface of a recording sheet. By this method, the water resistance of the recorded images can be improved. However, the light resistance of the images becomes poor. The result is that the overall quality of the recorded images cannot be improved by this method.

SUMMARY OF THE INVENTION

It is therefore an object of the present invention to provide a recording method by use of inks, which method is capable of yielding color images with totally improved image quality, in particular, having high water resistance and high light resistance.

According to the present invention, the above object is attained by a recording method in which there are employed an aqueous ink comprising at least one dye selected from the group consisting of the following dyes (a) through (d), and a recording medium containing at least one component selected from the group consisting of water-soluble salts of metals with an ion valence of 2 or more, alkyl amines, polyamines and quaternary ammonium salts.

(a) pyrazolone azo dyes of the following formula I

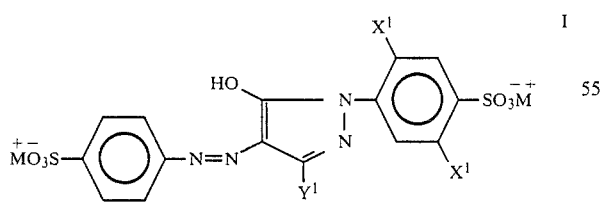

where $M^+$ represents $Li^+$, $Na^+$, $K^+$, $Cs^+$, $NH_4^+$ or $NR_4^{1+}$ (in which $R^1$ represents an alkyl group), $X^1$ represents F, Cl, Br, I or hydrogen, and $Y^1$ represents hydrogen, an alkyl group or $-COO-M^+$.

(b) phthalocyanine sulfonate dyes of the following formula II

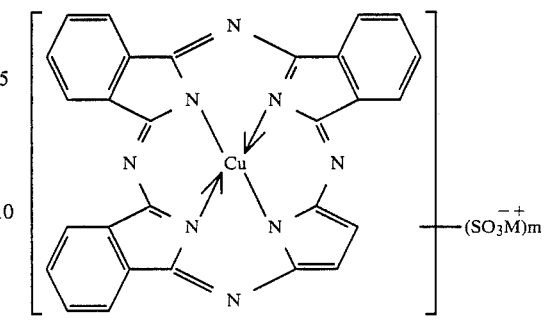

where $M^+$ is the same as that defined in the formula I, and m is an integer of 2 to 4.

(c) xanthene dyes of the following formula III or IV

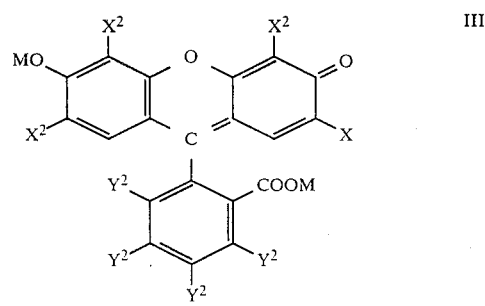

where M represents Li, Na, K, Cs, $NH_4$ or $NR_4^1$ (in which $R^1$ represents an alkyl group), $X^2$ represents Br, I or Cl, and $Y^2$ represents Br, I or Cl.

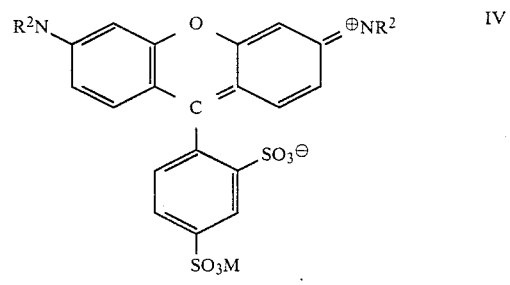

where M is the same as that in the formula III, and $R^2$ represents hydrogen or an alkyl group.

(d) azo dyes of the following formula V or VI

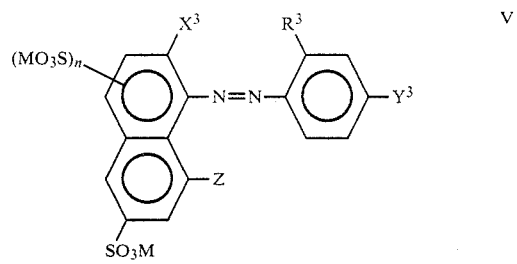

wherein n is an integer of 0 or 1, $X^3$ represents hydrogen or $-NH_2$, $Y^3$ represents hydrogen or $-NHR^1$ (in which $R^1$ represents an alkyl group), Z represents hydrogen, $-OH$ or $-COOM$, and $R^3$ represents hydrogen, an alkyl group or —SO₃M (in which M is the same as that defined in formula III);

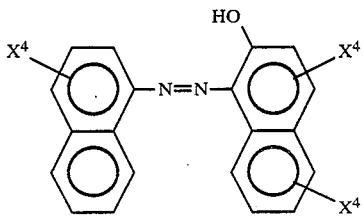

wherein $X^4$ represents hydrogen, —SO₃M or —COOM (in which M is the same as that defined in the formula III).

DETAILED DESCRIPTION OF THE PREFERRED EMBODIMENTS

Representative pyrazolone azo dyes of the previously described formula I are, for example, C.I. Acid Yellow 17 and C.I. Acid Yellow 23. The former is the dye with $X^1$ being Cl and $Y^1$ being a methyl group in the formula I, and the latter is the dye with $X^1$ being hydrogen, and $Y^1$ being —COONa. Both dyes are in the form of a sodium sulfonate.

Representative phthalocyanine sulfonate dyes of the previously described formula II are, for example, C.I. Direct Blue 87 and C.I. Acid Blue 249. The former is the dye with $M^+$ being $Na^+$, and m being 3 in the formula II, and the latter is the dye with $M^+$ being $Na^+$ and m being 4 in the formula II.

Representative dyes of the previously described xanthene dyes are, for example, C.I. Acid Red 52, C.I. Acid Red 92, C.I. Acid Red 94 and C.I. Acid Red 289.

Representative azo dyes of the previously described formula V or VI are C.I. Acid Red 143, C.I. Acid Red 254, C.I. Acid Red 274 and C.I. Acid Red 260.

In the present invention, as the metal salts to be applied to the surface of the recording medium or to be contained in the recording medium for treating the recording medium, the following can be employed: calcium chloride, calcium sulfate, calcium nitrate, magnesium chloride, magnesium sulfate, magnesium nitrate, aluminum chloride, aluminum sulfate, aluminum nitrate, barium chloride, barium nitrate, ferrous chloride, strontium chloride, strontium nitrate, stannous chloride, stannous fluoride, gallium chloride, gallium sulfate and gallium nitrate. When one of the above metal salts is employed as a treatment agent for the recording medium in the present invention, it is preferable that it be contained in the recording medium in an amount of 0.2 g/m² or more, more preferably in an amount of 0.5 g/m² or more.

As the treatment agent for the recording medium, the following alkyl amine salts can also be employed: decylamine acetate, undecylamine acetate, dodecylamine acetate, tridecylamine acetate, tetradecylamine acetate, pentadecylamine acetate, hexadecylamine acetate, heptadecylamine acetate, octadecylamine acetate, nonadecylamine acetate and eicosylamine acetate. When the above alkyl amine salts are employed as the treatment agent in the present invention, it is preferable that the agent be contained in the recording medium in an amount of 0.1 g/m² or more.

As the treatment agent for the recording medium, the following polyamines can also be employed: polyamide polyamine resin, polyamide-polyamine-epichlorohydrin resin, and quaternary cationic bridged polymers prepared by the reaction of the acetic acid salt or hydrochloric acid salt of polydimethylaminoethyl methacrylate and epichlorohydrin. When the above polyamines are employed as the treatment agent in the present invention, it is preferable that the agent be contained in the recording medium in an amount of 0.1 g/m² or more.

As the treatment agent for the recording medium, the following quaternary ammonium salts can also be employed: cetyltrimethyl ammonium bromide, cetyltrimethyl ammonium chloride, alkylisoquinolium bromide, alkylisoquinolium chloride, hexadodecyltrimethyl ammonium bromide and hexadodecyltrimethyl ammonium chloride. When the above quaternary ammonium salts are employed as the treatment agent in the present invention, it is preferable that the agent be contained in the recording medium in an amount of 0.1 g/m² or more.

The above treatment agents can be contained in the recording medium or applied thereto, for example, by one of the following methods:

(1) The agent is contained when the recording medium is made. (2) The agent is contained in the surface layer of the recording medium. (3) The agent is applied to the recording medium.

The images recorded on the thus treated recording medium by the ink containing one of or any combination of the previously described dyes are improved on the water resistance and light resistance thereof.

Of the above described treatment agents, aluminum chloride, calcium chloride and octadecylamine acetate are particularly effective for improvement of the water resistance and light resistance of the recorded images.

The inks employed in the present invention are particularly useful for ink-jet recording. These inks are useful not only for ink-jet recording, but also for use with conventional writing instruments.

BRIEF DESCRIPTION OF THE DRAWING

The drawing is a schematic representation illustrating a representative process according to this invention.

Embodiments of an ink recording method according to the present invention will now be explained by referring to the following examples:

EXAMPLE 1

In a 5 wt.% aqueous solution of aluminum chloride, there was immersed a commercially available recording sheet for ink-jet recording with a size degree of 0 sec, a brightness of 80 degrees (measured by a testing method for brightness by Hunter of paper and pulp in accordance with the Japanese Industrial Standard P 8123) and with a surface pH of 8, whereby the recording sheet was coated with the aluminum chloride with a deposition of 1.5 g/m² when dried, so that a recording medium for use in the present invention was prepared.

The following inks were prepared in accordance with the following respective formulations:

|  | Parts by Weight |
|---|---|
| Ink A (magenta) | |
| C.I. Acid Red 92 | 3 |
| (commercially available from Daiwa Dyestuff Mfg. Co., Ltd.) | |
| Glycerin 8 | |
| Diethylene glycol | 24 |

-continued

| | Parts by Weight |
|---|---|
| Deltop 33 | 0.5 |
| (commercially available from | |
| Takeda Chemical Industries, Ltd.) | |
| Pure Water | 56.5 |
| Ink B (cyan) | |
| Copper phthalocyanine tetrasulfonic acid | 3 |
| (commercially available from | |
| Sumitomo Chemical Co., Ltd.) | |
| Glycerin | 8 |
| Diethylene glycol | 24 |
| Deltop 33 | 0.5 |
| (commercially available from | |
| Takeda Chemical Industries, Ltd.) | |
| Pure Water | 56.5 |
| Ink C (yellow) | |
| C.I. Acid Yellow 23 | 3 |
| (commercially available from | |
| Daiwa Dyestuff Mfg. Co., Ltd.) | |
| Glycerin | 8 |
| Diethylene glycol | 24 |
| Deltop 33 | 0.5 |
| (commercially available from | |
| Takeda Chemical Industries, Ltd.) | |
| Pure Water | 56.5 |

The above inks were ejected individually or in such combinations as shown in Table 1 from a nozzle with a diameter of 60 μm at a speed of 17 m/sec to form dot images on the above-treated recording sheet.

The water resistance of the dot images was determined by immersing the dot-image-bearing recording sheets in water at a temperature of 30° C. for 1 minute, 5 minutes after the formation of the dot images by each ink, and then measuring the difference between the image density of the dot images before the immersion and the image density after the immersion, thereby assessing the ratio of the fading of the dot images.

The colors of the dot images were evaluated by a GATF color evaluation method, by which the hue error and change in greyness of the dot images were assessed.

The light resistance of the dot images was determined by exposing the dot images to the light of a carbon arc for 3 hours and assessing by a fade meter the ratio of the fading of the images caused by the exposure.

The results are shown in Table 1.

For comparison, dot images were formed in the same manner as described above on the same recording sheet as that employed in Example 1, but which was not treated by the aqueous solution of aluminum chloride, and were then subjected to the same tests for assessing the water resistance, the hue error and change in greyness and the light resistance of the dot images. The results are also shown in Table 1.

TABLE 1

| | Treated Paper | Untreated Paper |
|---|---|---|
| Magenta | Ink A | Ink A |
| Water Resistance (Fading ratio) | 9.0 | 29.6 |
| Light Resistance (Fading ratio) | 5.8 | 10.7 |
| Hue Error | 56.8 | 48.9 |
| Greyness | 8.1 | 6.1 |
| Drying Time (sec) | 2.0/less | 2.0/less |
| Cyan | Ink B | Ink B |
| Water Resistance (Fading ratio) | 4.5 | 32.0 |
| Light Resistance | | |

TABLE 1-continued

| | Treated Paper | Untreated Paper |
|---|---|---|
| (Fading ratio) | 0 | 1.0 |
| Hue Error | 35.0 | 34.0 |
| Greyness | 18.0 | 16.0 |
| Drying Time (sec) | 2.0/less | 2.0/less |
| Yellow | Ink C | Ink C |
| Water Resistance (Fading ratio) | 18.6 | 72.6 |
| Light Resistance (Fading ratio) | 2.8 | 4.1 |
| Hue Error | 9.1 | 11.6 |
| Greyness | 5.7 | 5.5 |
| Drying Time (sec) | 2.0/less | 2.0/less |
| Mixed Color (Red) | Ink A + Ink C | Ink A + Ink C |
| Water Resistance (Fading ratio) | 19.0 | 70.0 |
| Light Resistance (Fading ratio) | 6.5 | 10.0 |
| Mixed Color (Blue) | Ink A + Ink B | Ink A + Ink B |
| Water Resistance (Fading ratio) | 10.0 | 28.0 |
| Light Resistance (Fading ratio | 6.0 | 11.0 |
| Mixed Color (Green) | Ink B + Ink C | Ink B + Ink C |
| Water Resistance (Fading ratio) | 19.0 | 73.0 |
| Light Resistance (Fading ratio) | 3.0 | 3.0 |

EXAMPLE 2

An aqueous solution containing 0.6 wt.% of octadecylamine acetate and 2 wt.% of polyvinyl alcohol was applied to a recording sheet with a size degree of 4 sec, a brightness of 82 degrees (measured by a testing method for brightness by Hunter of paper and pulp in accordance with the Japanese Industrial Standard P 8123) and with a surface pH of 5.5, whereby the solid components of the solution were deposited in an amount of 5 g/m$^2$ on the recording sheet when dried, so that a recording medium for use in the present invention was prepared.

The following inks were prepared by mixing the following respective components in accordance with the following respective formulations:

| | Parts by Weight |
|---|---|
| Ink D (magenta) | |
| C.I. Acid Red 254 | 3 |
| (commercially available from | |
| Nippon Kayaku Co., Ltd.) | |
| Glycerin | 8 |
| Diethylene glycol | 24 |
| Deltop 33 | |
| (commercially available from | |
| Takeda Chemical Industries, Ltd.) | 0.5 |
| Pure Water | 64.5 |
| Ink E (cyan) | |
| Copper phthalocyanine trisulfonic acid | 3 |
| (commercially available from | |
| Daiwa Dyestuff Mfg. Co., Ltd.) | |
| Glycerin | 8 |
| Diethylene glycol | 24 |
| Deltop 33 | 0.5 |
| (commercially available from | |
| Takeda Chemical Industries, Ltd.) | |
| Pure Water | 64.5 |

-continued

| | Parts by Weight |
|---|---|
| Ink F (yellow) | |
| C.I. Acid Yellow 17 | 3 |
| (commercially available from | |
| Daiwa Dyestuff Mfg. Co., Ltd.) | |
| Glycerin | 8 |
| Diethylene glycol | 24 |
| Deltop 33 | 0.5 |
| (commercially available from | |
| Takeda Chemical Industries, Ltd.) | |
| Pure Water | 64.5 |

The above inks were ejected individually or in such combinations as shown in Table 2 from a nozzle with a diameter of 60 μm at a speed of 17 m/sec, thereby forming dot images on the above-treated recording medium.

The water resistance, the hue error and change in greyness and the light resistance of the dot images were determined in the same manner as in Example 1. The results are shown in Table 2.

For comparison, dot images were formed on the above recording sheet without the above described treatment, in the same manner as in Example 1, and were then subjected to the same tests for assessing the water resistance, the hue error and change in greyness and the light resistance thereof. The results are also shown in Table 2.

TABLE 2

| | Treated Paper | Untreated Paper |
|---|---|---|
| Magenta | Ink D | Ink D |
| Water Resistance (Fading ratio) | 10.0 | 40.0 |
| Light Resistance (Fading ratio) | 1.0 | 3.0 |
| Hue Error | 40.3 | 37.5 |
| Greyness | 15.3 | 16.2 |
| Drying Time (sec) | 2.0/less | 2.0/less |
| Cyan | Ink E | Ink E |
| Water Resistance (Fading ratio) | 0 | 29.0 |
| Light Resistance | 2.6 | 1.0 |
| Hue Error | 31.8 | 32.1 |
| Greyness | 15.4 | 18.4 |
| Drying Time (sec) | 2.0/less | 2.0/less |
| Yellow | Ink F | Ink F |
| Water Resistance (Fading ratio) | 27.0 | 60.0 |
| Light Resistance (Fading ratio) | 0 | 3.5 |
| Hue Error | 9.5 | 9.5 |
| Greyness | 5.0 | 4.5 |
| Dryness Time (sec) | 2.0/less | 2.0/less |
| Mixed Color (Red) | Ink D + Ink F | Ink D + Ink F |
| Water Resistance (Fading ratio) | 25.0 | 60.0 |
| Light Resistance (Fading ratio) | 1.0 | 3.5 |
| Mixed Color (Blue) | Ink D + Ink E | Ink D + Ink E |
| Water Resistance (Fading ratio) | 10.0 | 40.0 |
| Light Resistance (Fading ratio) | 2.5 | 3.0 |
| Mixed Color (Green) | Ink E + Ink F | Ink E + Ink F |
| Water Resistance (Fading ratio) | 24.0 | 60.0 |
| Light Resistance (Fading ratio) | 3.0 | 3.5 |

TABLE 2-continued

| | Treated Paper | Untreated Paper |
|---|---|---|
| (Fading ratio) | | |

EXAMPLE 3

In a 5 wt.% aqueous solution of calcium chloride, there was immersed a commercially available recording sheet for ink-jet recording with a size degree of 0 sec, a brightness of 80 degrees (measured by a testing method for brightness by Hunter of paper and pulp in accordance with the Japanese Industrial Standard P 8123) and with a surface pH of 8, which was the same recording sheet as that employed in Example 1, whereby the recording sheet was coated with the calcium chloride with a deposition of 3.5 g/m$^2$ when dried, so that a recording medium for use in the present invention was prepared.

A magenta Ink G was prepared in accordance with the following formulation:

| Ink G (magenta) | Parts by Weight |
|---|---|
| C.I. Acid Red 289 | 3 |
| (commercially available from | |
| Daiwa Dyestuff Mfg. Co., Ltd.) | |
| Glycerin | 8 |
| Diethylene glycol | 24 |
| Deltop 33 | |
| (commercially available from | |
| Takeda Chemical Industries, Ltd.) | 0.5 |
| Pure Water | 64.5 |

By use of the above Ink G, a mixed red ink prepared by mixing Ink C (yellow) (prepared in Example 1) and the Ink G and a mixed blue ink prepared by mixing Ink B (cyan) (prepared in Example 1) and the above Ink G, dot images were formed on the above prepared recording medium and were then subjected to the same tests for assessing the water resistance, the hue error and change in greyness and the light resistance of the dot images as in Example 1. The results are shown in Table 3.

For comparison, dot images were formed on the recording sheet without the above treatment, in the same manner as in Example 1, and were then subjected to the same tests for assessing the water resistance, the hue error and change in greyness and the light resistance thereof. The results are also shown in Table 3.

EXAMPLE 4

In a 3 wt.% aqueous solution of tetradecylamine acetate, there was immersed a recording sheet with a size degree of 4 sec, a brightness of 82 degrees (measured by a testing method for brightness by Hunter of paper and pulp in accordance with the Japanese Industrial Standard P 8123) and with a surface pH of 5.5, which was the same recording sheet as that employed in Example 2, whereby the recording sheet was coated with the tetradecylamine acetate with a deposition of 1.0 g/m$^2$ when dried, so that a recording medium for use in the present invention was prepared.

A magenta Ink H was prepared in accordance with the following formulation:

| Ink H (magenta) | Parts by Weight |
| --- | --- |
| C.I. Acid Red 274 (commercially available from Nippon Kayaku Co., Ltd.) | 3 |
| Glycerin | 16 |
| Diethylene glycol | 16 |
| Deltop 33 (commercially available from Takeda Chemical Industries, Ltd.) | 0.5 |
| Pure Water | 64.5 |

By use of the above Ink H, a mixed red ink prepared by mixing Ink F (yellow) (prepared in Example 2) and the Ink H and a mixed blue ink prepared by mixing Ink E (cyan) (prepared in Example 2) and the above Ink H, dot images were formed on the above prepared recording medium and were then subjected to the same tests for assessing the water resistance, the hue error and change in greyness and the light resistance of the dot images as in Example 1. The results are shown in Table 3.

For comparison, dot images were formed on the same untreated recording sheet as that employed in Example 2, in the same manner as in Example 1, and were then subjected to the same tests for assessing the water resistance, the hue error and change in greyness and the light resistance thereof. The results are also shown in Table 3.

EXAMPLE 5

In a 7 wt.% aqueous solution of aluminum chloride, there was immersed the same recording sheet as that employed in Example 2, whereby the recording sheet was coated with the aluminum chloride with a deposition of 4 g/m$^2$ when dried, so that a recording medium for use in the present invention was prepared.

A magenta Ink I was prepared in accordance with the following formulation:

| Ink I (magenta) | Parts by Weight |
| --- | --- |
| C.I. Acid Red 143 (commercially available from Nippon Kayaku Co., Ltd.) | 5 |
| Glycerin | 6 |
| Diethylene glycol | 12 |
| Deltop 33 (commercially available from Takeda Chemical Industries, Ltd.) | 0.5 |
| Pure Water | 75.5 |

By use of the above Ink I, a mixed red ink prepared by mixing INk C (yellow) and the Ink I and a mixed blue ink prepared by mixing Ink B (cyan) and the above Ink I, dot images were formed on the above prepared recording medium and were then subjected to the same tests for assessing the water resistance, the hue error and change in greyness and the light resistance of the dot imges as in Example 1. The results are shown in Table 3.

For comparison, dot images were formed on the same untreated recording sheets as that employed in Example 2, in the same manner as in Example 1, and were then subjected to the same tests for assessing the water resistance, the hue error and change in greyness and the light resistance thereof. The results are also shown in Table 3.

EXAMPLE 6

In a 4 wt.% aqueous solution of aluminum chloride, there was immersed the same recording sheet as that employed in Example 1, whereby the recording sheet was coated with the aluminum chloride with a deposition of 3.0 g/m$^2$ when dried, so that a recording medium for use in the present invention was prepared.

A magenta Ink J was prepared in accordance with the following formulation:

| Ink J (magenta) | Parts by Weight |
| --- | --- |
| C.I. Acid Red 94 (commercially available from Hodogaya Chemical Co., Ltd.) | 4.5 |
| Glycerin | 12 |
| Diethylene glycol | 25 |
| Deltop 33 (commercially available from Takeda Chemical Industries, Ltd.) | 0.5 |
| Pure Water | 58 |

By use of the above ink J, a mixed red ink prepared by mixing Ink C (yellow) and the Ink J and a mixed blue ink prepared by mixing Ink B (cyan) and the above Ink J, dot images were formed on the above prepared recording medium and were then subjected to the same tests for assessing the water resistance, the hue error and change in greyness and the light resistance of the dot images as in Example 1. The results are shown in Table 3.

For comparison, dot images were formed on the same untreated recording sheet as that employed in Example 1, in the same manner as in Example 1, and were then subjected to the same tests for assessing the water resistance, the hue error and change in greyness and the light resistance thereof. The results are also shown in Table 3.

TABLE 3

|  | Treated Paper | Untreated Paper |
| --- | --- | --- |
| Example 3 | | |
| Magenta | Ink G | Ink G |
| Water Resistance (Fading ratio) | 30.0 | 56.0 |
| Light Resistance (Fading ratio) | 2.0 | 12.0 |
| Hue Error | 12.2 | 9.8 |
| Greyness | 17.2 | 20.4 |
| Mixed Color (Red) | Ink C + Ink G | Ink C + Ink G |
| Water Resistance (Fading ratio) | 30.0 | 75.0 |
| Light Resistance (Fading ratio) | 3.0 | 12.0 |
| Mixed Color (Blue) | Ink B + Ink G | Ink B + Ink G |
| Water Resistance (Fading ratio) | 30.0 | 56.0 |
| Light Resistance (Fading ratio) | 2.0 | 12.0 |
| Example 4 | | |
| Magenta | Ink H | Ink H |
| Water Resistance (Fading ratio) | 18.0 | 25.0 |
| Light Resistance (Fading ratio) | 5.0 | 12.8 |
| Hue Error | 31.0 | 36.1 |
| Greyness | 17.4 | 19.4 |

TABLE 3-continued

|  | Treated Paper | Untreated Paper |
|---|---|---|
| Mixed Color (Red) | Ink H + Ink F | Ink H + Ink F |
| Water Resistance (Fading ratio) | 30.0 | 75.0 |
| Light Resistance (Fading ratio) | 5.0 | 12.8 |
| Mixed Color (Blue) | Ink E + Ink H | Ink E + Ink H |
| Water Resistance (Fading ratio) | 18.0 | 30.0 |
| Light Resistance (Fading ratio) | 5.0 | 13.0 |
| Example 5 | | |
| Magenta | Ink I | Ink I |
| Water Resistance (Fading ratio) | 15.0 | 60.0 |
| Light Resistance (Fading ratio) | 0 | 0.5 |
| Hue Error | 44.5 | 40.4 |
| Greyness | 23.7 | 23.2 |
| Mixed Color (Red) | Ink I + Ink C | Ink I + Ink C |
| Water Resistance (Fading ratio) | 19.0 | 73.0 |
| Light Resistance (Fading ratio) | 3.0 | 4.0 |
| Mixed Color (Blue) | Ink I + Ink B | Ink I + Ink B |
| Water Resistance (Fading ratio) | 17.0 | 60.0 |
| Light Resistance (Fading ratio) | 0 | 1.0 |
| Example 6 | | |
| Magenta | Ink J | Ink J |
| Water Resistance (Fading ratio) | 5.0 | 5.0 |
| Light Resistance (Fading ratio) | 10.0 | 15.0 |
| Hue Error | 40.0 | 35.0 |
| Greyness | 8.0 | 8.0 |
| Mixed Color (Red) | Ink J + Ink C | Ink J + Ink C |
| Water Resistance (Fading ratio) | 19.0 | 73.0 |
| Light Resistance (Fading ratio) | 10.0 | 15.0 |
| Mixed Color (Blue) | Ink J + Ink B | Ink J + Ink B |
| Water Resistance (Fading ratio) | 5.0 | 35.0 |
| Light Resistance (Fading ratio) | 12.0 | 15.0 |

EXAMPLE 7

By dispersing the following components, a dispersion was prepared:

|  | Parts by Weight |
|---|---|
| Calcium carbonate | 17 |
| Zinc chloride | 4 |
| Styrene-butadiene copolymer Latex (Solid components) | 19 |
| Polyvinyl alcohol | 2 |
| Water | 58 |

The above dispersion was applied to one side of a sheet of high quality paper with a 12 g/m² deposition of the solid components (when dried) by a doctor blade and was then dried at 105° C. for 5 minutes. Thereafter, the coated sheet was subjected to calendering to make the surface of the coated sheet smooth.

Ink A (magenta), Ink B (cyan), Ink C (yellow) were individually ejected from a nozzle with a diameter of 60 μm at a speed of 17 m/sec, so that dot images were formed on the above treated sheet. The thus formed dot images were then subjected to the same tests as in Example 1 for assessing the water resistance, the hue error and change in greyness and the light resistance of the dot images. The results are shown in Table 4.

For comparison, a comparative dispersion was prepared in the same manner as mentioned above in accordance with the following formulation:

|  | Parts by Weight |
|---|---|
| Calcium carbonate | 17 |
| Styrene-butadiene copolymer Latex (Solid components) | 19 |
| Polyvinyl alcohol | 2 |
| Water | 58 |

In the above formulation, only zinc chloride was eliminated from the first-mentioned formulation. The thus prepared comparative dispersion was applied to one side of a sheet of the same high quality paper as mentioned above with a 12 g/m² deposition of the solid components (when dried) by a doctor blade and was then dried at 105° C. for 5 minutes.

Thereafter the comparative coated sheet was subjected to calendering in the same manner mentioned above, thereby making the surface thereof smooth.

Ink A, Ink B and Ink C were individually ejected from the same nozzle at the same speed as mentioned above, thereby forming dot images on the comparative coated sheet.

The dot images formed on the comparative coated sheet were then subjected to the same tests for assessing the water resistance, the hue error and change in greyness and the light resistance thereof. The results are also shown in Table 4.

TABLE 4

|  | Example | | | Comparative Example | | |
|---|---|---|---|---|---|---|
|  | Ink A | Ink B | Ink C | Ink A | Ink B | Ink C |
| Water Resistance (Fading ratio) | 3.5 | 0 | 17.3 | 75.3 | 34.5 | 70.5 |
| Light Resistance (Fading ratio) | 5.0 | 1.0 | 1.9 | 32.0 | 8.2 | 5.3 |
| Hue Error | 43.0 | 26.3 | 9.0 | 44.0 | 25.8 | 11.3 |
| Greyness | 6.7 | 18.2 | 6.2 | 5.8 | 19.1 | 5.7 |
| Drying Time (sec)/less | 2 | 2 | 2 | 2 | 2 | 2 |

EXAMPLE 8

By dispersing the following components, a dispersion was prepared.

|  | Parts by Weight |
|---|---|
| Silica (Oil adsorption 130) | 10 |
| Aluminum chloride | 4 |
| Acryl latex (solid components) | 3 |
| Polyvinyl alcohol | 13 |
| Starch | 3 |

-continued

| | Parts by Weight |
|---|---|
| Water | 67 |

The above dispersion was applied to one side of a sheet of acetate film with a thickness of 75 μm, with a 8 g/m² deposition of the solid components (when dried) by an air-knife coating method and was then dried at 90° C. for 10 minutes, whereby a recording medium for ink-jet printing for use in the present invention was prepared.

Ink D (magenta), Ink E (cyan) and Ink F (yellow) were individually ejected from a nozzle with a diameter of 60 μm at a speed of 17 m/sec, so that dot images were formed on the above prepared recording medium. The thus formed dot images were then subjected to the same tests as in Example 1 for assessing the water resistance, the hue error and change in greyness and the light resistance of the dot images. The results are shown in Table 5.

For comparison, a comparative dispersion was prepared in the same manner as mentioned above in accordance with the following formulation:

| | Parts by Weight |
|---|---|
| Silica (Oil adsorption 130) | 10 |
| Acryl latex (solid components) | 3 |
| Polyvinyl alcohol | 13 |
| Starch | 3 |
| Water | 67 |

In the above formulation, only aluminum chloride was eliminated from the first-mentioned formulation in Example 8. The thus prepared comparative dispersion was applied to one side of a sheet of the same acetate film as mentioned above with a 8 g/m² deposition of the solid components (when dried) by the same air-knife coating method and was then dried at 90° C. for 10 minutes, whereby a comparative recording medium was prepared.

Ink D, Ink E and Ink F were individually ejected from the same nozzle at the same speed as mentioned above on the comparative recording medium, thereby forming dot images thereon.

The dot images formed on the comparative recording medium were then subjected to the same tests as in Example 1 for assessing the water resistance, the hue error and change in greyness and the light resistance thereof. The resulted are also shown in Table 5.

TABLE 5

| | Example | | | Comparative Example | | |
|---|---|---|---|---|---|---|
| | Ink D | Ink E | Ink F | Ink D | Ink E | Ink F |
| Water Resistance (Fading ratio) | 73 | 0 | 20.0 | 53 | 32.0 | 73.2 |
| Light Resistance (Fading ratio) | 1.5 | 0.5 | 1.0 | 4.8 | 2.7 | 5.2 |
| Hue Error | 28.3 | 24.2 | 9.1 | 25.5 | 25.1 | 8.9 |
| Greyness | 14.1 | 19.2 | 6.2 | 15.3 | 18.2 | 5.3 |

As can be seen from the above described embodiments of the recording method according to the present invention and the comparative examples, the present invention provides a recording method capable of yielding color images with totally improved image quality, in particular, having high water resistance and high heat resistance.

What is claimed is:

1. A recording method which comprises imagewise applying (1) an aqueous ink comprising at least one dye selected from the group consisting of the following dyes (a) through (d) onto (2) a recording medium containing at least one component selected from the group consisting of water soluble metal salts in which the metal has a valence of 2 or more, alkyl amine salts, polyamines and quaternary ammonium salts, whereby to form an image on said recording medium, (a) a pyrazolone azo dye of the following formula I

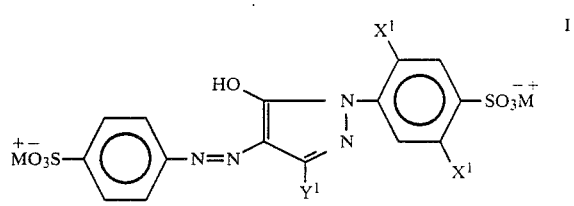

where $M^+$ represents $Li^+$, $Na^+$, $K^+$, $Cs^+$, $NH_4^+$ or $NR_4^{1+}$ wherein $R^1$ represents an alkyl group, $X^1$ represents F, Cl, Br, I or hydrogen, and $Y^1$ represents hydrogen, an alkyl group or $-COO-M^+$;

(b) a phthalocyanine sulfonate dye of the following formula II

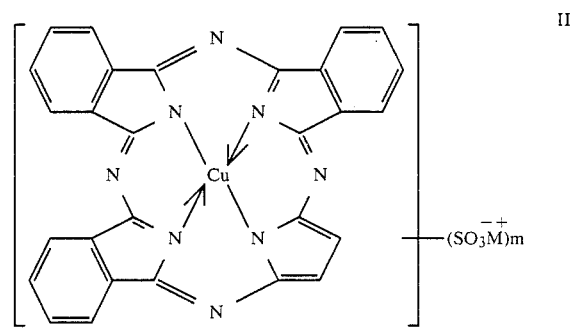

where $M^+$ is the same as that defined in the formula I, and m m is an integer of 2 to 4;

(c) a xanthene dye of the following formula III or IV

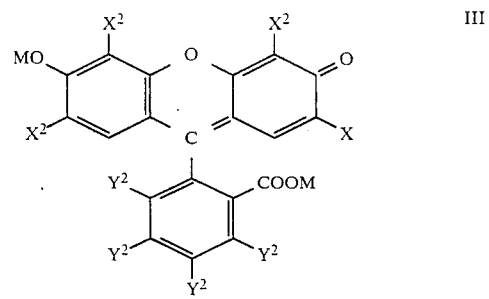

where M represents Li, Na, K, Cs, $NH_4$ or $NR_4^1$ wherein $R^1$ represents an alkyl group, $X^2$ represents Br, I or Cl, and $Y^2$ represents Br, I or Cl;

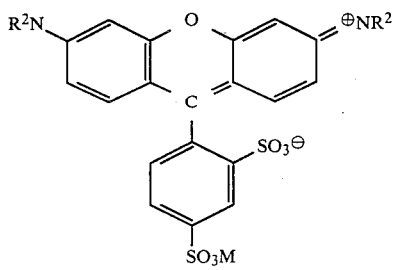

where M is the same as that in the formula III, and $R^2$ represents hydrogen or an alkyl group;

(d) an azo dye of the following formula V or VI

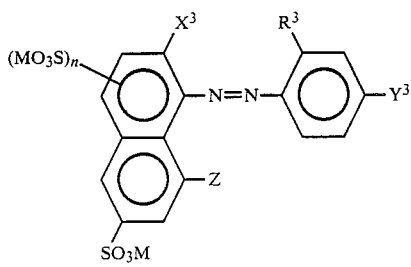

where n is an integer of 0 or 1, $X^3$ represents hydrogen or $-NH_2$, $Y^3$ represents hydrogen or $-NHR^1$ wherein $R^1$ represents an alkyl group, Z represents hydrogen, $-OH$ or $-COOM$, and $R^3$ represents hydrogen, an alkyl group or $-SO_3M$ wherein M is the same as that defined in formula III;

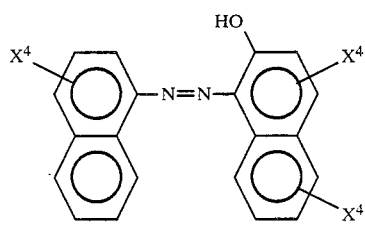

wherein $X^4$ represents hydrogen, $-SO_3M$ or $-COOM$ in which M is the same as that defined in the formula III.

2. A recording method as claimed in claim 1, wherein said water-soluble metal salt is selected from the group consisting of calcium chloride, calcium sulfate, calcium nitrate, magnesium chloride, magnesium sulfate, magnesium nitrate, aluminum chloride, aluminum sulfate, aluminum nitrate, barium chloride, barium nitrate, ferrous chloride, strontium chloride, strontium nitrate, stannous chloride, stannous fluoride, gallium chloride, gallium sulfate and gallium nitrate.

3. A recording method as claimed in claim 1, wherein said alkyl amine salt is selected from the group consisting of decylamine acetate, undecylamine acetate, dodecylamine acetate, tridecylamine acetate, tetradecylamine acetate, pentadecylamine acetate, hexadecylamine acetate, heptadecylamine acetate, octadecylamine acetate, nonadecylamine acetate and eicosylamine acetate.

4. A recording method as claimed in claim 1, wherein said polyamine is selected from the group consisting of polyamide polyamine resin, polyamide-polyamine-epichlorohydrin resin, and quaternary cationic bridged polymers prepared by the reaction of the acetic acid salt or hydrochloric acid salt of polydimethylaminoethyl methacrylate and epichlorohydrin.

5. A recording method as claimed in claim 1, wherein said quaternary ammonium salt is selected from the group consisting of cetyltrimethyl ammonium bromide, cetyltrimethyl ammonium chloride, alkylisoquinolium bromide, alkylisoquinolium chloride, hexadodecyltrimethyl ammonium bromide and hexadodecyltrimethyl ammonium chloride.

6. A recording method as claimed in claim 1, wherein said pyrazolone azo dye is selected from the group consisting of C.I. Acid Yellow 17 and C.I. Acid Yellow 23.

7. A recording method as claimed in claim 1, wherein said phthalocyanine sulfonate dye is selected from the group consisting of C.I. Direct Blue 87 and C.I. Acid Blue 249.

8. A recording method as claimed in claim 1, wherein said xanthene dye is selected from group consisting of C.I. Acid Red 52, C.I., Acid Red 92, C.I. Acid Red 94 and C.I. Acid Red 289.

9. A recording method as claimed in claim 1, wherein said azo dye is selected from the group consisting of C.I. Acid Red 143, C.I. Acid Red 254, C.I. Acid Red 274 and C.I. Acid Red 260.

10. A recording method as claimed in claim 2, wherein the content of said water-soluble metal salt in said recording medium is 0.2 g/m² or more.

11. A recording method as claimed in claim 3, wherein the content of said alkyl amine salt in said recording medium is 0.1 g/m² or more.

12. A recording method as claimed in claim 4, wherein the content of said polyamine in said recording medium is 0.1 g/m² or more.

13. A recording method as claimed in claim 5, wherein the content of said quaternary ammonium salt in said recording medium is 0.1 g/m² or more.

14. A recording method as claimed in claim 1 wherein said component of said recording medium is selected from the group consisting of aluminum chloride, calcium chloride and octadecylamine acetate.

* * * * *

UNITED STATES PATENT AND TRADEMARK OFFICE
CERTIFICATE OF CORRECTION

PATENT NO.   : 4 554 555
DATED        : November 19, 1985
INVENTOR(S)  : Tamotsu ARUGA et al It is certified that error appears in the above-identified patent and that said Letters Patent is hereby corrected as shown below:

Column 14, lines 52-64 correct the formula to read as follows:

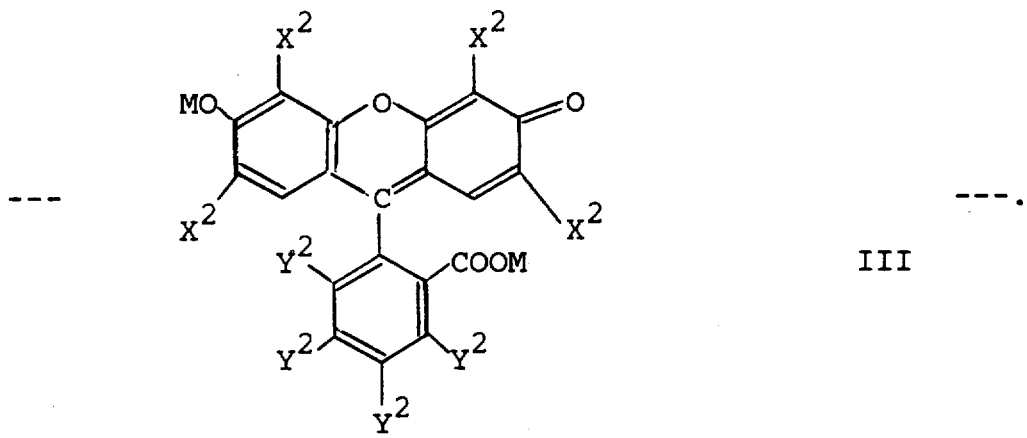

III

Signed and Sealed this

Twenty-second Day of April 1986

[SEAL]

Attest:

DONALD J. QUIGG

Attesting Officer        Commissioner of Patents and Trademarks